(12) United States Patent
Olsson et al.

(10) Patent No.: US 8,038,478 B2
(45) Date of Patent: Oct. 18, 2011

(54) CORDLESS ELECTRICAL CONNECTION WITH SIMPLE KEY

(76) Inventors: Jorgen Olsson, Norrtalje (SE); Thomas Bjorling, Norrtalje (SE)

( * ) Notice: Subject to any disclaimer, the term of this patent is extended or adjusted under 35 U.S.C. 154(b) by 0 days.

(21) Appl. No.: 12/600,294

(22) PCT Filed: May 15, 2008

(86) PCT No.: PCT/SE2008/000334
§ 371 (c)(1),
(2), (4) Date: Nov. 16, 2009

(87) PCT Pub. No.: WO2008/147279
PCT Pub. Date: Dec. 4, 2008

(65) Prior Publication Data
US 2010/0130066 A1      May 27, 2010

(30) Foreign Application Priority Data
May 25, 2007  (SE) .................................. 0701337-8

(51) Int. Cl.
H01R 25/00 (2006.01)
(52) U.S. Cl. ....................................... 439/650; 439/139
(58) Field of Classification Search .................. 439/650, 439/374, 136–141
See application file for complete search history.

(56) References Cited

U.S. PATENT DOCUMENTS

| | | | | |
|---|---|---|---|---|
| 4,142,770 A | * | 3/1979 | Butler et al. | 439/140 |
| 5,272,431 A | * | 12/1993 | Nee | 320/109 |
| 5,584,712 A | * | 12/1996 | Fukushima | 439/141 |
| 5,646,500 A | | 7/1997 | Wilson | |
| 5,971,810 A | * | 10/1999 | Taylor | 439/675 |
| 2007/0141877 A1 | * | 6/2007 | Lee et al. | 439/137 |

FOREIGN PATENT DOCUMENTS

| | | |
|---|---|---|
| FR | 2 828 589 A1 | 2/2003 |
| SE | 0502113-4 A | 3/2007 |
| WO | WO 2007/035165 A1 | 3/2007 |

OTHER PUBLICATIONS

International Search Report, dated Sep. 18, 2008, from corresponding PCT application.

* cited by examiner

*Primary Examiner* — Tulsidas C Patel
*Assistant Examiner* — Travis Chambers
(74) *Attorney, Agent, or Firm* — Young & Thompson

(57) ABSTRACT

A mechanical and earthed safety contact intended for both small and large withdrawals of power and may for instance be used for connecting a vehicle to the electrical power net includes a telescopic part with a key and a docking unit, which when in mechanical contact interacts with each other for transmission of electric current. The docking unit includes multiple spring pins, of which one is pushed in when the key reaches the front of the docking unit. Transmission of current between the docking unit and the key can take place only when this pin is pushed in far enough. Contact surfaces on the key are used for exchange of information in interaction with contact surfaces of canals containing the spring pins. The key may have a seal that tightens against such a canal to protect the transmission of energy and signal.

11 Claims, 10 Drawing Sheets

CORDLESS ELECTRICAL CONNECTION WITH SIMPLE KEY

TECHNICAL FIELD

The present invention relates to a mechanical contact, which can be used when a cordless electrical connection is desired, for example in electrical vehicles and industrial trucks and to replace the engine heater cable in vehicles such as cars, busses and trucks.

BACKGROUND

The previously, the commonly known solution for connecting a vehicle to the electricity distribution network is the ordinary engine heater cable. Another, less known, solution is the induction coupling, which is used to convey large currents in the accumulators of electrical vehicles. Both solutions require precision when connecting.

In previous patent applications a technique is described which is used to effect a cordless connection between a vehicle and the electric power net, see Swedish patent application 0502113-4 and published international patent application WO 2007/035165. These applications show a cordless connection which requires very low precision when connecting.

DESCRIPTION OF THE INVENTION

The purpose of the invention is to present a device for cordless electrical connection of an object with aid of a key designed to function together with docking units.

The cordless connection mainly constitutes of a to the object, which can be a vehicle, associated unit which works as a key for withdrawal of electric current and exchange of information in interaction with a docking unit, placed for instance at a parking lot.

The key may be placed on a telescopic part or in some other manner so that it can be advanced towards the docking unit, for example by being ejected. At docking, the unit of the object is able to communicate with the docking unit. Information such as user identity can reach the docking unit, which can then be unlocked for feeding of power to the object. If the unit of the object and the docking unit are part of a debit system this can be activated.

The docking unit contains multiple spring pins, of which one is pushed in when the key reaches the front of the docking unit. Transmission of current between the docking unit and the key is effected in the primary case only when this pin is pushed in far enough. Since multiple pins are arranged adjacent to each other in a pattern, only low precision is required when the key is advanced towards the front of the docking unit.

The front of the key is equipped with suitable steering, for example shaped as a steering ball, designed to simplify inserting the key into a canal containing a pin of the docking matrix. The key may, with proper design, also function as sealing against water after docking.

FIGURE DESCRIPTION

The invention will now be described in closer detail in connection to non-limiting examples of execution with references to enclosed drawings in which:

FIG. 1 is a schematic cross-sectional view of a row of a pin matrix in a docking unit, FIG. 2 is a schematic cross-sectional view of a column of a pin matrix in a docking unit, FIG. 3 is a schematic cross-sectional view of a key to be used for energy withdrawal from a docking unit, FIG. 4 is a front view of a pin matrix, FIG. 5 depicts a car parked in front of a docking unit, FIG. 6 depicts a car in process of connecting to a docking unit, FIG. 7 depicts a car connected to a docking unit, FIG. 8 is a view from behind of a pin modified for transmission of three-phase current, FIG. 9 is a top view of the pin of FIG. 8, FIG. 10 is a side view of the pin of FIG. 8, FIG. 11 is a front view of upper and lower power rails modified for connection to three-phase voltage, and FIG. 12 is a cross-sectional view of the upper and lower power rails of FIG. 11.

DETAILED DESCRIPTION

A method and devices for cordless electrical connection of an object will now be described. The description will be conducted in reference to a vehicle, a passenger vehicle in particular, but the electrical connection can be used in all mobile or moving objects which require or may require transference of electricity. The electrical connection is primarily intended for transmission of electrical energy and may particularly be used for connecting the object to a high voltage. By high voltage we mean for instance the voltage of the public electric power net, or a voltage large enough to be harmful to people, in general larger than say 100 V. The electrical connection may also be used for other cases of transference of electricity, such as signal transfer or connection to a low voltage.

Figure 4:
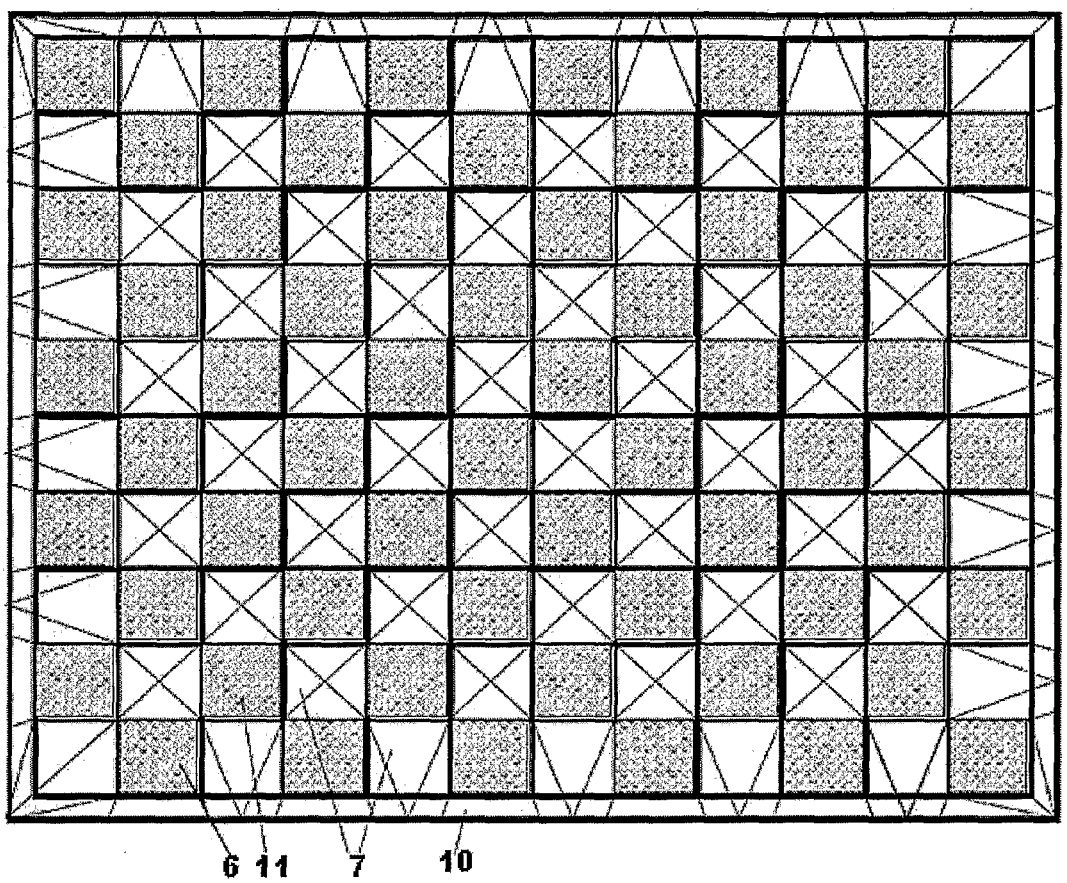
Figure 5:
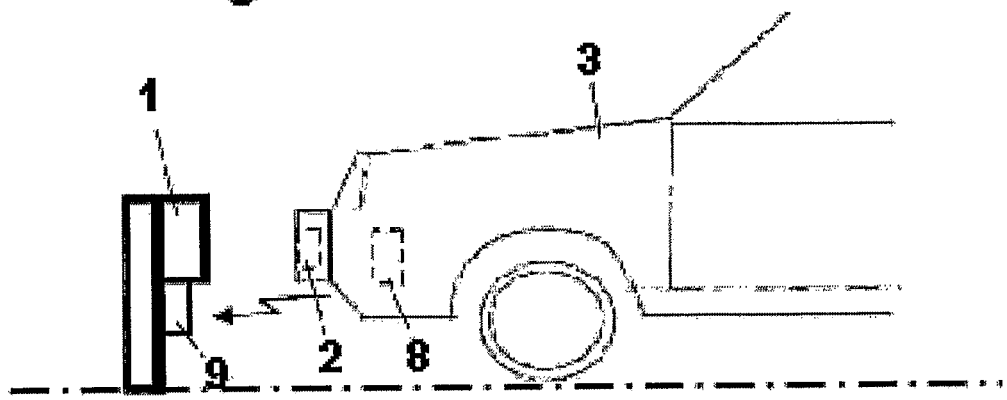
Figure 6:
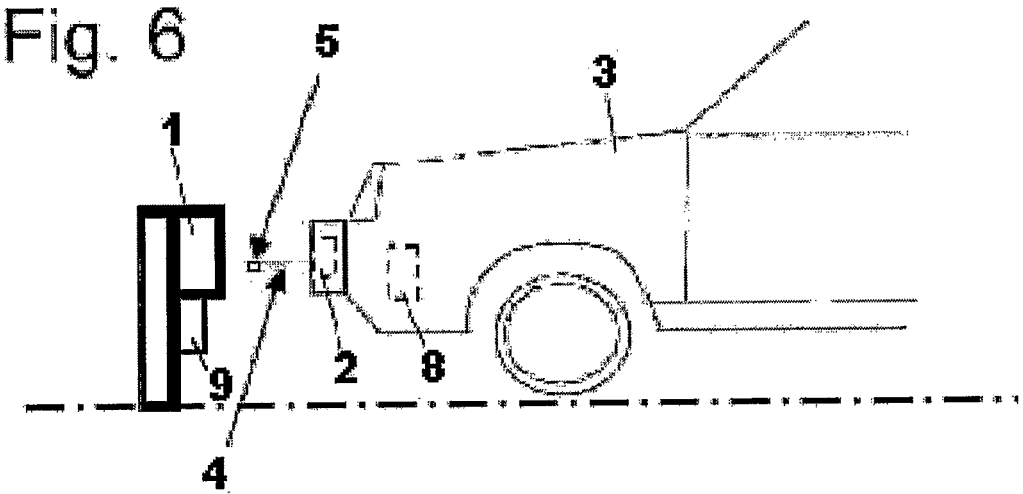
Figure 7:
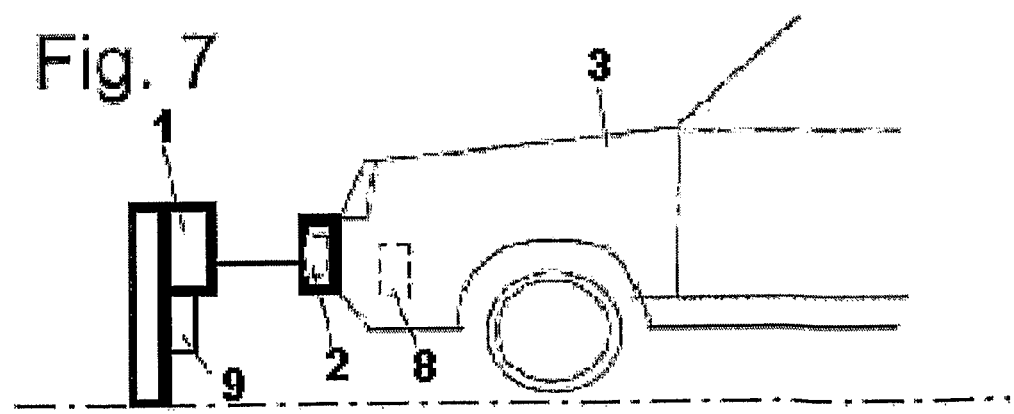

In the case where the electrical connection is used for cordless connection of a vehicle to a high tension electrical power net, as shown in FIG. 5-7, a first part 1 of the connection, herein referred to as the docking unit, may be mounted at one end of a parking space and oriented perpendicularly to the longitudinal direction of the parking space, while a second part 2 of the connection, herein referred to as the telescopic part, is mounted at the front of the vehicle 3. As the vehicle is parked an arm 4 is ejected horizontally from the telescopic part. The anterior part of the arm constitutes or carries a contact part 5, see also FIG. 3, herein referred to as the key. The arm is ejected adequately for the key to be pushed in far enough into the docking unit 1, which has a vertical receiving surface made up by the anterior surfaces of elastically suspended, horizontally mobile pins 6 and interjacent fixed frame parts 7 of the docking unit, see FIG. 4. Before the arm 4 is ejected towards the docking unit 1 it may be confirmed or verified, if this is required, that the vehicle is actually able to, or has the right to, connect to the docking unit in question. This may be done by a communication where a wireless unique signal is sent from a unit 8 on the vehicle 3 and received and answered by a unit 9, placed inside, close to or in the vicinity of the docking unit 1. A received affirmative signal may directly activate ejection of the arm 4 from the telescopic part 2 without any additional command or input.

The spring pins 6 of the docking unit 1 thus form a pin matrix as shown in FIG. 4, i.e. a for instance regular pattern made up by pins and interjacent frame parts 7. Every spring pin is completely surrounded by frame parts and governed in a way such that it can not become in mechanical or electrical contact with any of the other spring pins. The intermediate frame parts 7 and an outer surrounding frame part 10 are all made of electrically isolating material, as are the anterior parts 11 of the spring pins 6, which free surfaces are visible in FIG. 4, see also FIGS. 1 and 2. As the key 5 reaches the vertical, towards the vehicle directed, surface of the docking unit 1, the anterior end of the key will hit the anterior surface of a spring pin and/or a frame part 7, 10. The free surfaces of the frame parts are advisably executed in a way such that, at contact, they will guide the key towards a spring pin 6, for example by having the shape of steering ridges 12. For instance, the anterior part of the interjacent frame parts 7 can be given the shape of a pyramid, and in particular may then the interjacent parts of the inner frame parts form a regular pyramid, see FIGS. 1 and 2. If a steering ridge 12 is hit by the key 5 the key will then be guided to the electrically isolating anterior parts of a spring pin 6'. This pin will then be pushed inwards between the adjacent frame parts by the telescopic part 2, which is working against a spring force. The key 5 is pushed in further until a certain counter force is obtained, at or after which the telescopic part is notified that the pin 6' is pushed in far enough by signal exchange between electrically conducting surfaces of the pin 6' and the key.

Figure 3:
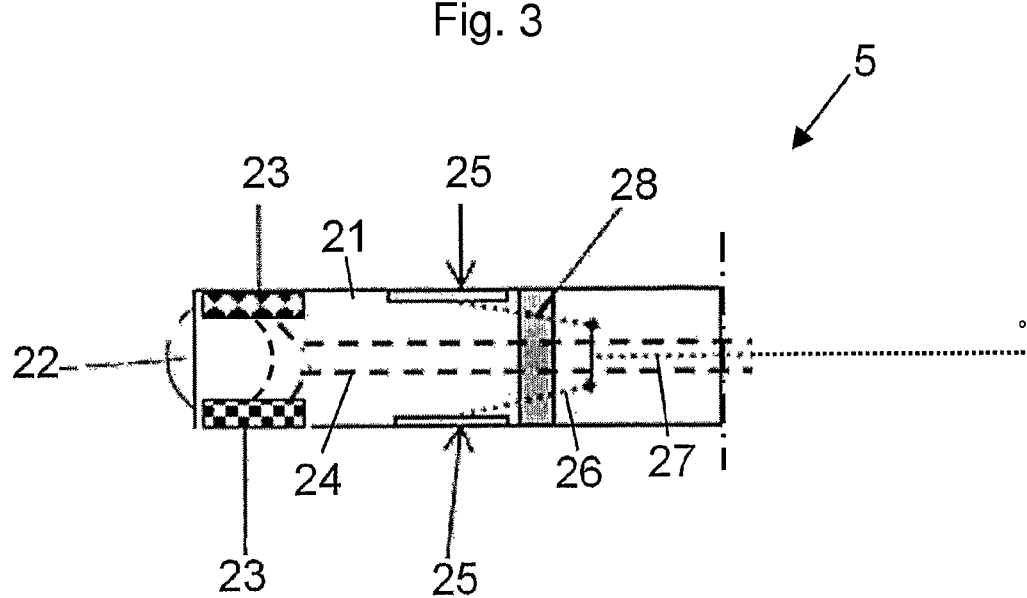

The construction of the key 5 is illustrated in FIG. 3. It comprises an elongated main part 21 of electrically isolating material, said main part 21 being in the shape of a bar with uniform thickness and with rectangular or square cross-section, i.e. basically as a rectangular parallelepiped. The forward surface of the main part has a steering shape 22 which will simplify guiding of the key towards a spring pin 6 of the docking unit 1. For instance, the guiding shape of the main part may be shaped as a spherical cap, i.e. a suitable part of a sphere, or have a pyramidal shape, more or less rounded, not shown. The steering shape 22 may in a particular case be spherical, where a sphere is mounted in a recess at the front of the key and is able to rotate freely around its centre.

The forward end of the key 5 has two parallel sides with electrically conducting surfaces 23, for instance the ones that are horizontal when the key is in use, which surfaces 23 are electrically isolated from each other and are intended for the desired electrical transmission. These surfaces may thus be connected to high tension, for instance one to zero potential and the other to electric phase. The connection may be done using cables as suggested at 24.

At a distance from the forward end, the key 5 has two additional electrically conducting surfaces 25, which are also opposite each other and on the same sides as the forward conducting surfaces 23 and electrically isolated from these. They are electrically connected to each other by cables 26 and connected to a cable 27 for information exchange. Directly behind these surfaces there may be a sealing 28.

Figure 1:
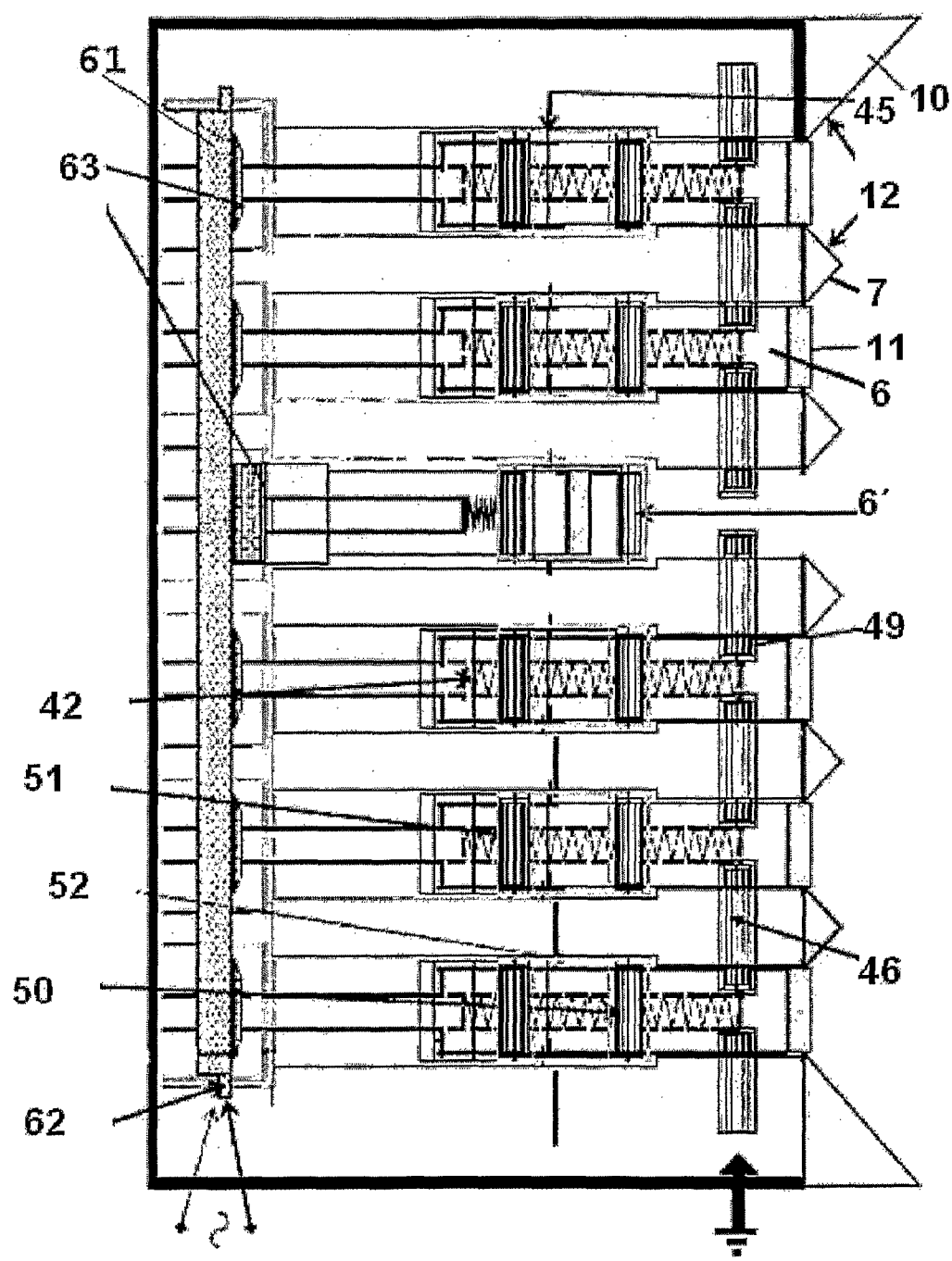

The construction of the docking unit will now be described in connection to FIGS. 1 and 2. The docking unit 1 comprises a main part 31 which is made of electrically conducting material. The frame parts 7, 10 are part of the main part. Between the frame parts elongated spaces or canals 32 are defined in a regular pattern as seen in FIG. 4. The canals contain the spring pins 6. The cross section of the forward parts of the canals and the spring pins, near the surface of the docking unit which faces the key when this is about to be inserted, is essentially the same as that of the part of the key 5 which will be inserted into a canal 32. If the canals and the spring pins are arranged in a chessboard like pattern, as shown in FIG. 4, this implies that also the forward parts of the intermediate frame parts have essentially the same cross section.

Figure 2:
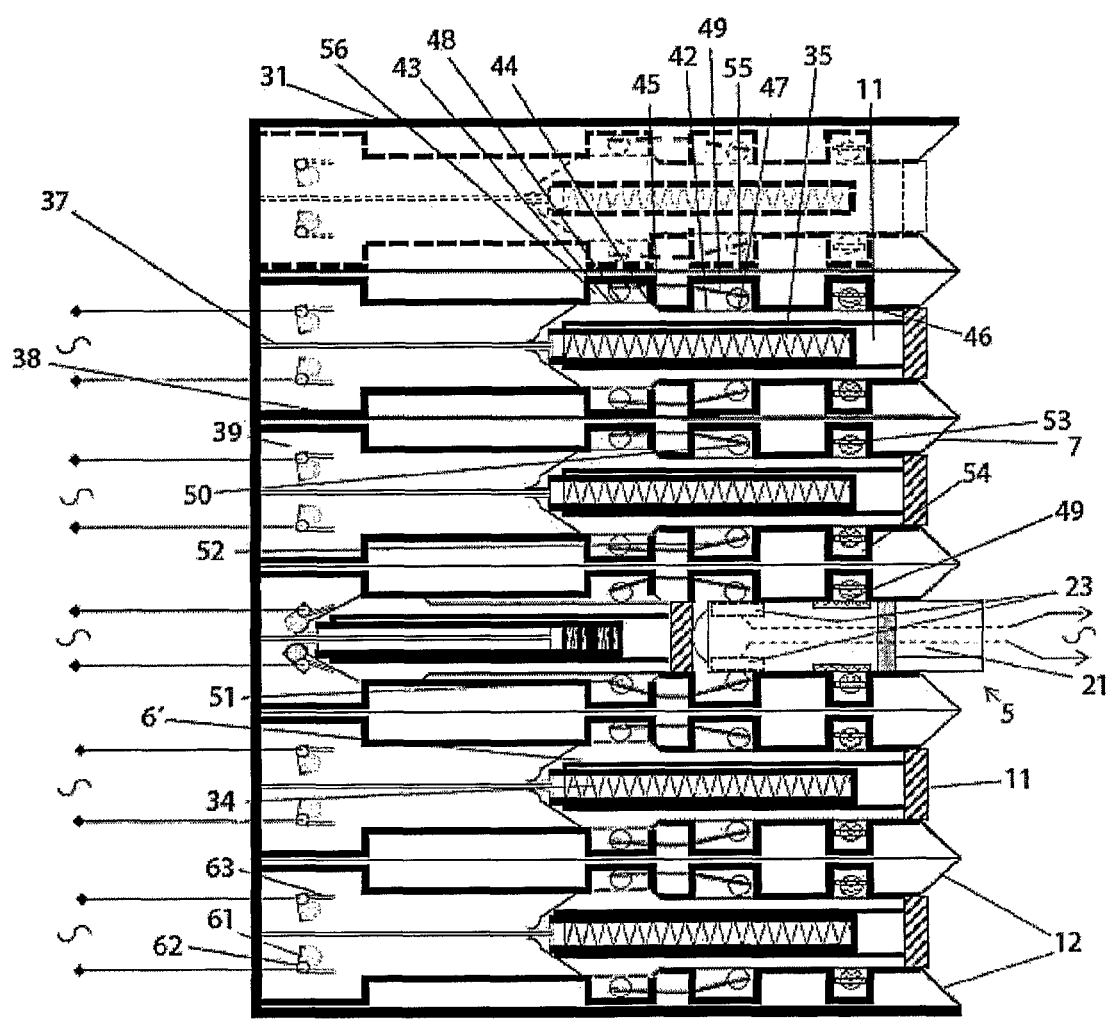

The spring pins 6 have main parts 33, see FIG. 2, made of electrically isolating material. The main parts have the shape of elongated, uniform rods with rectangular cross-section. Inside them are deep longitudinal, axial cavities or dead end holes 34, with constant and uniform cross-section along its entire length, starting from the rear surfaces of the pins. Inside these dead end holes or canals compression springs 35 are mounted, that acts on the bottom of the dead end holes and on the free end of spring supports 36, which are part of the fixed main part 31 of the docking unit 1. The spring supports have the shape of uniform pegs and are placed along the longitudinal axis of the canals 32 of the docking unit. The spring supports 36 run in the inner canals 34 of the spring pins and may have essentially the same cross-section as these. The spring supports are connected at their inner end to for instance horizontally arranged thinner partition walls 37, which are attached to a rear inner wall of the main part 31 of the docking unit. In the same way the intermediate frame parts 7 are attached to partition walls 38. In this way horizontal cavities 39 are created, at the bottom of the canals 32, that run along the above described rear inner wall of the main part 31 of the docking unit.

The forward parts of the main parts 33 of the spring pins carry the front plates 11, made of electrically conducting material, and at two opposite side surfaces, which are horizontal in the example, electrically conducting side plates 42. These side plates are electrically isolated from each other, attached to the back of the front plates, and have at the rear end elevated sections 43 with a transition area 44 between the anterior, thinner sections 45. The transition area may for instance have an inclined surface, which may be plane, vertical in the example, and at an angle of say 45° to the surfaces of the anterior and rear sections of the side plates 42. The forward, thinner sections are part of the above mentioned forward part of the spring pins 6, which has a constant cross section.

In the uninfluenced state of the spring pins the surface of the transition area 44 bear against corresponding surfaces of transition areas 45 of the walls of the canals 32. These transition areas may in a corresponding way have a plane surface, be vertical in the example, and at an angle of 45° to the surfaces of the walls of the canals, which bear against the electrically conducting side plates 42. In this way the transition areas 44, 45 make up a stopper to the spring pins 6 when acted upon by the compression springs 35.

Several electrically conducting surfaces bear against the side plates in the uninfluenced state of the spring pins. At some distance from the open end of the canals 32 are two opposite contact surfaces 46 for signal transfer and control of earth. Further into the canals are at each side of the transmission areas 45 pairs of opposite contact surfaces 47 and 48. In these last pairs, surfaces that are along the same side inside the canals are electrically connected to each other by cables 49. All these different contact surfaces are surfaces of prestressed spring contact parts 49, 50 and 51. Out of these contact parts, the ones which have surfaces that are electrically connected to each other can be prestressed by using a common flat spring 52. This will then be applied at a section of the main part 31, behind the opposite transition area 45, and may also constitute the electrical connection 49. The contact parts may be designed as contact cylinders, which obtain their spring prestressing by being compelled into rectangular, elongated recesses in resilient thin sheet-metal contact parts 52, 53, such that the width of the recesses is less than the axial diameter of the contact cylinders. Furthermore, the contact parts may be placed in elongated spaces 54, 55 and 56, which extend across all the canals 32 at a direction perpendicular to the canals. In the example the elongated spaces are oriented horizontally. The elongated spaces 54, 55 and 56 are parallel to the rear elongated spaces 39 described above.

In each of the rear elongated spaces 39 runs a contact rail 61 used for transmission of high tension, also named connection rail or power rail. The contact rail is rotatable around a longitudinal axis 62. Resilient, electrically isolating tongues 63, see especially FIG. 1, are attached to the rail opposite each adjacent canal 32.

The function of the device will now be described in closer detail. When a spring pin 6' is pushed into a canal 32 by the compressive force of the key 5, the electric connection to earth is broken. When the key is fully inserted, the anterior contact parts of the canal 32 are instead in electric connection with the contact surfaces 25, for signal transfer and to control that the vehicle or object is connected to electrical earth, and the contact parts 50 further inside the canal are in electric connection with the anterior contact surfaces 23 for transmission of current and energy to the key. Signal exchange may be carried out using the electrically conducting surfaces 46 of the canal, which are designed for this purpose, and corresponding surfaces 25 of the key.

For instance, the docking unit 1 could receive a signal carrying a user identity of a user of an electric distribution system (i.e. a system for distribution of electrical energy), not shown in figure, which the docking unit is part of. The user identity may be further transmitted to the distribution system, for example to charge the user for the energy withdrawn. Alternatively, the signal can be used to verify that the user is approved by the distribution system and has the right to withdraw energy at the docking unit in question. In the case where a debit system is used an identity code can be sent to verify that the user identity is connected to an account or an invoice system, and to send a signal to the docking unit, approving or denying energy withdrawal. The signals may be ciphered.

When the docking unit has obtained the go-ahead a control current, checking for earth, is placed over the anterior contact parts 46. The control current passes over that row of the matrix in which a pin (6') has been pushed in by the key 5. All the spring pins 6 which are unaffected lead the control current through their electrically conducting surfaces 46. When the pin 6' is pushed in far enough the control current will pass through the conducting surfaces 25 of the key for signal exchange and earth control. For this to be possible each of the anterior contact parts 49, with their respective contact surfaces, is divided into two electrically separated parts, see particularly FIG. 1. These isolated parts, which are part of anterior contact parts on each side of an interjacent frame part 7 of a column, are electrically connected, for instance by being part of the same contact cylinder, as shown in FIG. 1. In this way the control current can flow through this row of the matrix. The trigger unit of the docking unit, not shown in figure, checks the flow continuously. If the control current is unable to pass the trigger unit will determine that no connection to high tension is allowed. Furthermore, through the same contact surfaces the key 5 can be connected to protective earth. When the control current flows, a switch, not shown in figure, can be activated to connect high tension to the two power rails 61 in that row of the matrix which contains the pushed in pin 6'. Which row having been determined for instance by the preceding signal exchange. The power rails connects electrical phase and zero potential to the electrically conducting side plates 42 of the pin 6'. Current will then flow between the rails 61 and the vehicle 3 through the side plates, the inner contact parts 50, 51, their internal connections 49, 52 and the anterior conducting plates 23 of the key 5. All the other pins that are in the same row as 6' are electrically isolated from the high tension by the isolating parts 63 of the power rails 61. The isolating parts are put in place by a revolving movement as the power rails reach the rear ends of the side plates 42.

When the key 5 is inserted into a canal 32 the seal can tighten against the walls of the canal. The seal can be designed to expand inside the canal at pressure from the telescopic part 4, thereby protecting the electrically conducting transmission surfaces from water and humidity. The seal can constitute a ring made of rubber, or some similar material, placed in a circumferential groove at the rear end of the key. The key may be divided into two parts with the groove at the partition surface. The key 5 is pushed into the canal 32 by the telescopic part until a certain pressure is obtained, at which a pressure switch, not shown in figure, connected to the telescopic part will stop the forward movement. The two parts of the two-piece key are pushed closer together, with the seal in between, at which the slot is reduced (in width and/or depth) and the seal thus pushed outwards.

Alternatively, the seal of the key can be brought about by designing the key with a thicker, conical rear end, not shown in figure, so that it will tighten against the oblique surfaces of the frame parts 7, 10, surrounding the open end of the canal 32 when the key is fully inserted into the canal.

The system could also be used together with a debit system with remote control via Internet, SMS or telephone calls. After receiving a signal from the vehicle, possible via the docking unit, the debit system could send a signal by radio or by the electric power net, affirming that energy withdrawal is allowed.

Figure 8:
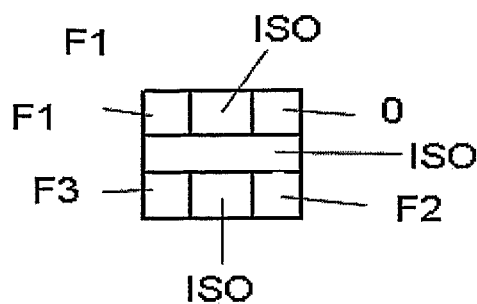
Figure 9:
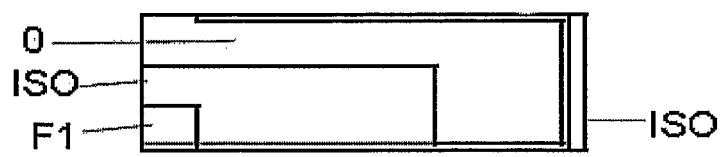
Figure 10:
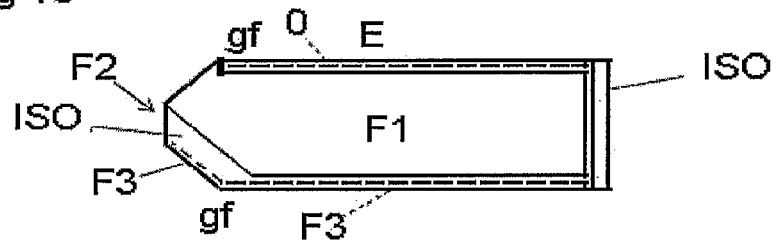
Figure 11:
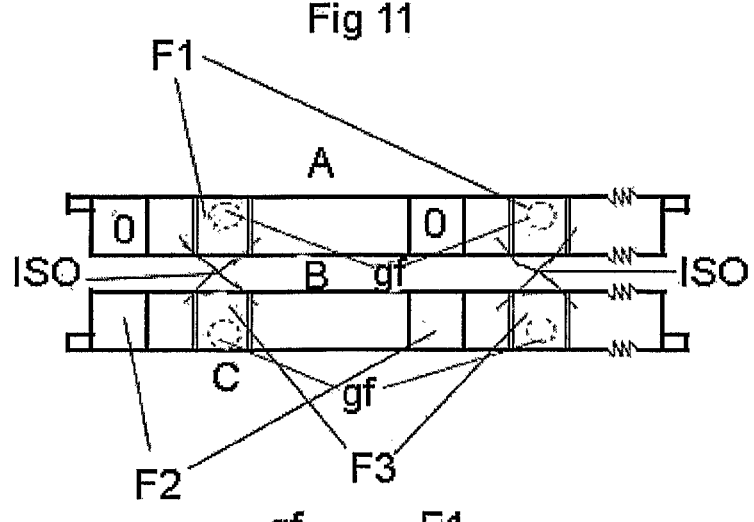
Figure 12:
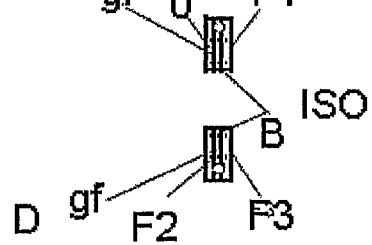

The spring pins can be design with conducting side plates on all side surfaces for transmission of three-phase current. The arrangement for connection to high tension will then be different. On a modified spring pin 6" each of the contact plates is divided into two electrically isolated parts 42', see FIG. 8-10. The anterior part of one of these conducting parts covers most of the side surface of the spring pin to be able to effect the transmission between the anterior contact surfaces 46 of the canal 32 into which the pin is inserted. At the forward-facing surface of each contact rail 61' are conducting surfaces electrically isolated from each other, see FIG. 11, for connection to zero potential "0" and phase potential F1, F2 and F3, respectively. To achieve this, the contact rail may contain an electrically isolating middle section, at the forward-facing surface on which the conducting surfaces are placed, which are connected by lead-ins gf to the conductive surfaces in the back of the rails, see FIG. 12.

Inside the canals, each of the rear or inner contact surfaces 47, 49 and corresponding contact parts 50, 51 is divided into two electrically isolated parts, not shown in figure, similarly to the anterior contact surfaces 46 and the contact parts 49, but without the two-and-two electrical connection. The resilient thin sheet-metal parts 49 are also divided into two electrically isolated parts. The forward, conducting surfaces 23 of the key 5 are in the same way divided into two electrically isolated parts, not shown.

Figure 13:
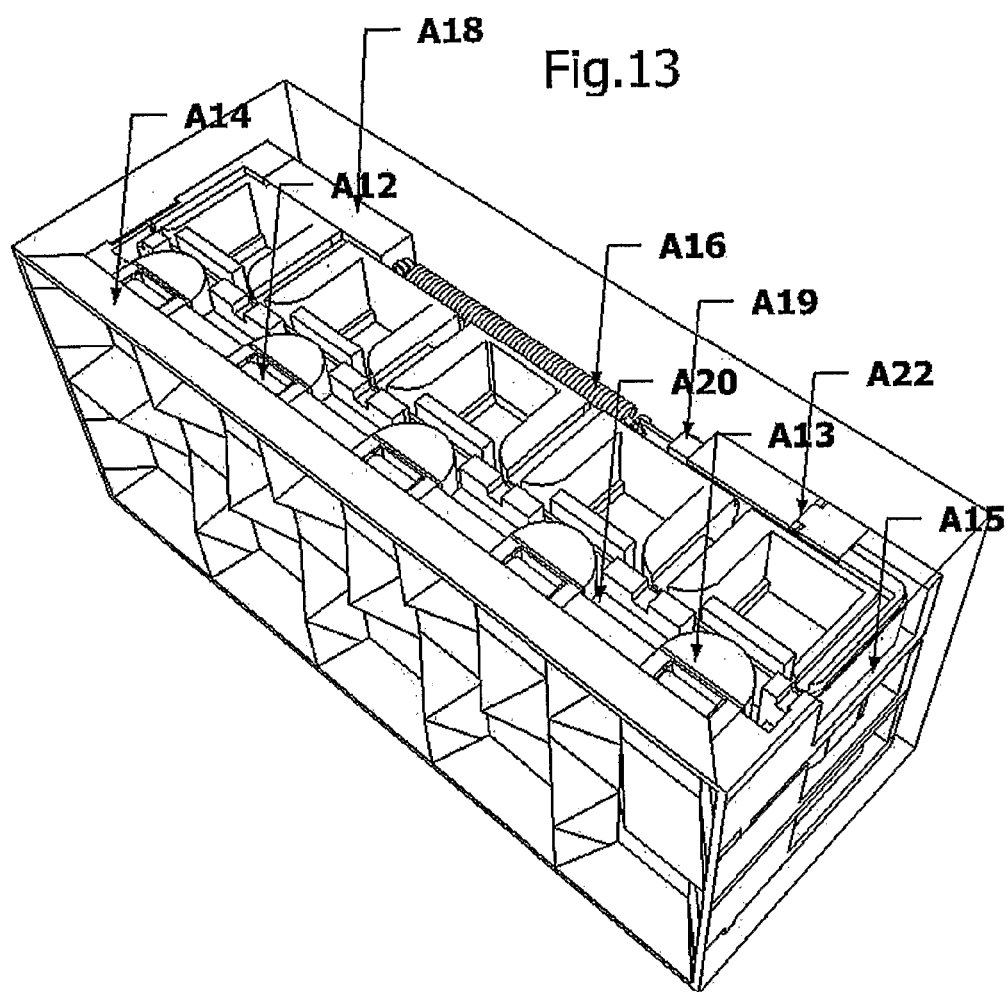
FIG. 13 illustrates another example of the matrix.
Figure 14:
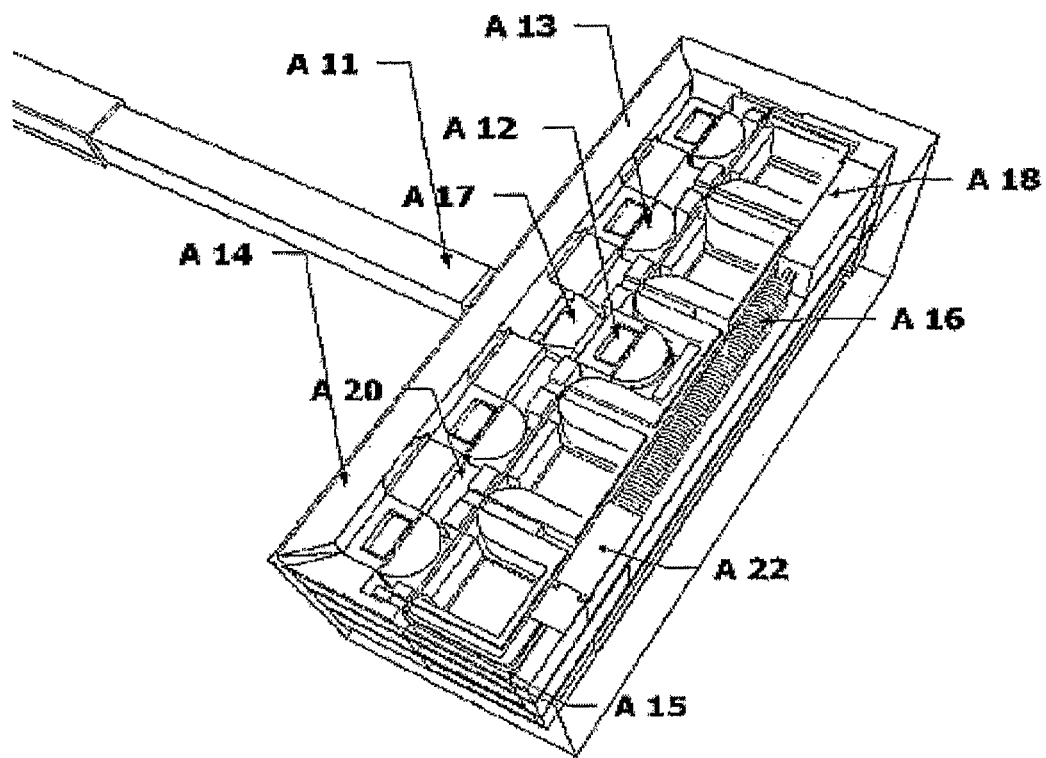
FIG. 14 is a view showing the matrix in FIG. 13 connected to the key located to a telescope.
Figure 15:
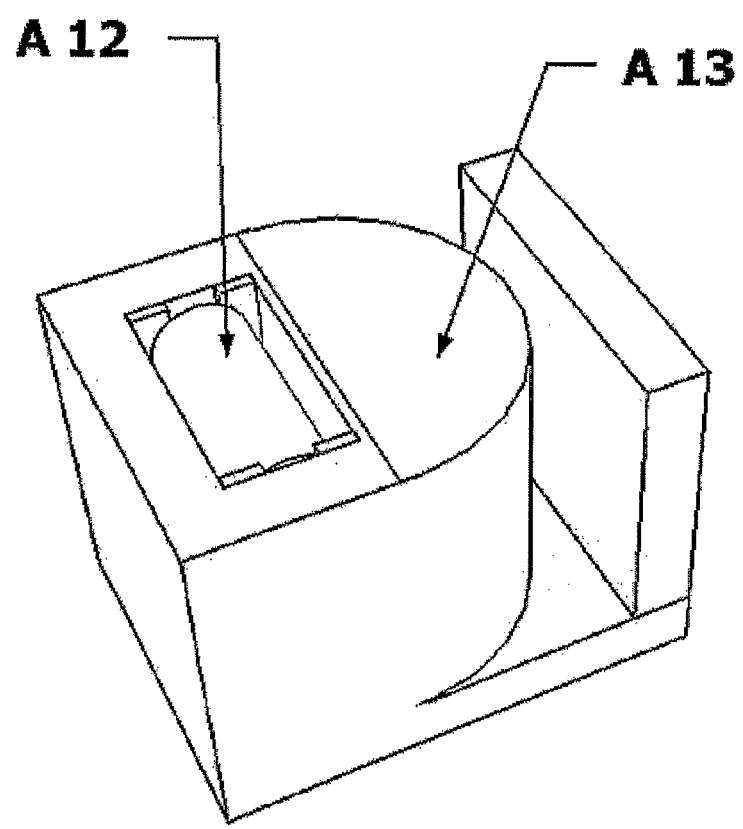
FIG. 15 is a view of a pin fitting the matrix in FIG. 13.
Figure 16:
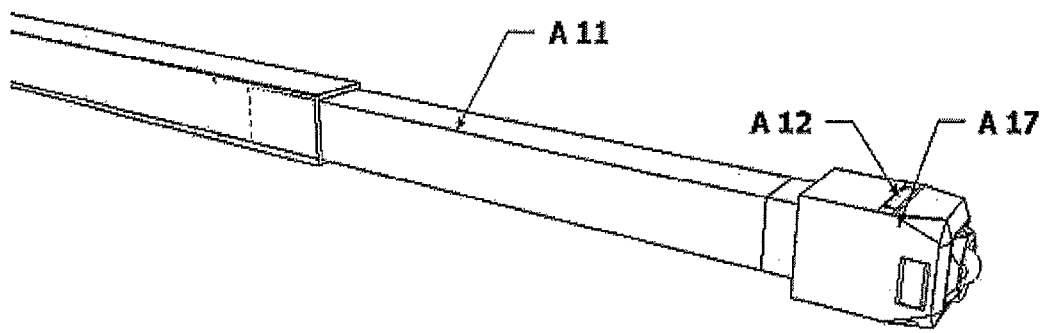
FIG. 16 is a view of a telescope with a key fitting the matrix in FIG. 13.

Another embodiment of the invention will now be described. The matrix may be arranged as in FIG. 13, where the pins A 13 are controlled by an inelastic band A15, having its ends applied to a spring A 16 via an electronics unit A18 and a hook A22. The band A15 thus extends transverse all of the pins A13 when they are in an unactivated state. When the vehicle is about to insert the key A 17 in to the matrix according to FIG. 13, via the telescopic part A 11, a wireless ID signal is sent to the electronics unit A 18. At correct ID, an electronic lock will release the hook A 22 in connection A 19 to the band and the spring A 16, making it possible to a pin A 13 to be pushed in, see FIG. 14. Then the band A15 will extend along a curved surface of the pushed-in pin A13, said curved surface of the pin A13 being visible in FIG. 15. Once a pin A 13 has been pushed in, all band portions A 15 of the remaining rows are locked by the electronic lock, so that no other pins A 13 in either row can be pushed in. The length of the band A15 will allow for only one of the pins A 13 to be pushed in at the time. The band A15 will act as a spring for the pushed-in pin A13. When the key is removed the band A15 will return the pushed-in pin A13 to its unactivated position. Thus, the band A15 replaces all the springs of the individual canals in the embodiment described above.

Earth control, via contact cylinders A 12 on the top of the pins A 13 and for these corresponding conducting surfaces in the top of the canals not showed, works as in the previously described example.

The two examples described above illustrates two out of many ways to control the spring pins and some different ways to arrange contact parts for transmission of high current, but the main theme of the invention remains the same, i.e. that the demand for precision when parking a vehicle is substantially reduced when the docking unit is designed in accordance with the invention, i.e. with a matrix or a pattern of steering parts A 14 and connection points/pins A 13.

The invention claimed is:

1. A cordless electrical connecting comprising:
   A docking unit and a single key, which when in mechanical contact interacts with each other for transmission of electric current and/or energy,
   wherein said pins can be pushed further into the docking unit,
   wherein said pins are arranged for movement in the same direction,
   wherein said pins are arranged in such a way that when the key is advanced towards the front of the docking unit, the key will come into mechanical contact with exactly one of the pins and push the contacted pin further into the docking unit, after which, when the contacted pin is pushed in far enough, electrical contact will be established between the key and the docking unit through conducting surfaces on the key and inside the docking unit, for transmission of electric current and/or electric energy,
   the pins being arranged in a pattern with electrically isolating intermediate parts located between the pins, so that the intermediate parts form parallel canals in which the pins are displaceable,
   the intermediate parts, at fee front surfaces, comprising guiding surfaces defining an exterior perimeter of each canal and guiding the key towards an adjacent pin of each canal so that the key enters exactly one of the canals and comes into mechanical contact with exactly one of the pins, and
   the docking unit further comprising a spring actuated inelastic band,
   wherein said inelastic band controls the pins so that when the one pin has been pushed in by the key, the remaining pins, in a row include the one pin pushed in by the key, are prevented from being pushed in.

2. The cordless electrical connection according to claim 1, characterized by electrical contact surfaces for signal exchange between the key and the docking unit.

3. The electrical connection according to claim 1, wherein the guiding surfaces of the intermediate parts are in the shape of ridges.

4. The electrical connection according to claim 1, wherein the guiding surfaces of the intermediate parts are in the shape of ridges having one of a pyramidal and a sub-pyramidal shape.

5. The electrical connection according to claim 1, wherein the pattern in which the pins are arranged defines a plural layer and plural column matrix with the electrically isolating intermediate parts located between the pins.

6. The electrical connection according to claim 1, characterized by the forward end of the key having a guiding surface, particularly in the shape of a sphere or part of a sphere, which at insertion of the key will guide the key towards an adjacent spring pin located inside a canal of the docking unit.

7. The cordless electrical connection according to claim 6, characterized by the guiding surface of the key involving a rotary ball.

8. A cordless electrical connection comprising:
   a docking unit and a key, which when in mechanical contact interacts with each other for transmission of electric current and/or energy,
   the docking unit comprising plural displaceable, resilient pretested pins arranged adjacent to each other,
   wherein said pins can be pushed further into the docking unit;
   wherein said pins are arranged for movement in the same direction;
   wherein said pins are arranged in such a way that when the key is advanced towards the front of the docking unit the key will come into mechanical contact with one of these pins and push the contacted pin further into the docking unit, after which, when the contacted pin is pushed in far enough, electrical contact will be established between the key and the docking unit through conducting surfaces on the key and inside the docking unit, for transmission of electric current and/or electric energy,
   the key, at its forward end, having a seal which tightens between the key and a canal of the pin to which the key is connected and thereby protects the connection against water and humidity, the seal of the key designed to expand inside the canal, or as a thicker, conical rear end.

9. A cordless electrical connection comprising:
   a docking unit and a single key, which when in mechanical contact interacts with each other for transmission of electric current and/or energy,
   the docking unit comprising a vertical receiving surface made up by anterior surfaces of elastically suspended, horizontally mobile spring pins and interjacent fixed frame parts, the pins and frame parts are arranged in a plural column and a plural row matrix arrangement within an outer surrounding frame,
   every pin surrounded by the frame parts and the surrounding frame, and are free of mechanical and electrical contact with all of the other pins,
   the frame parts and an outer surrounding frame being made of an electrically isolating material,
   the frame parts and surrounding frame defining plural canals, one pin in each canal,
   the frame parts and the surrounding frame comprising guiding surfaces sloped toward an adjacent one of the canals,
   the pins arranged such that when the key is advanced towards the receiving surface of the docking unit, an anterior end of the key will hit one of i) an anterior surface of exactly one of the pins, and ii) the guiding surface of one of the frame parts and the surrounding frame, when the key hits the guiding surface the key is guided to the anterior surface of the adjacent pin within the adjacent canal so that the key will come into mechanical contact with exactly one of the pins and push the contacted pin further into the docking unit, after which, when the contacted pin is pushed in far enough, electrical contact will be established between the key and the docking unit through conducting surfaces on the key and inside the docking unit, for transmission of electric current and/or electric energy so that a single key pushing a single pin establishes the electrical contact.

10. The electrical connection of claim 9, further comprising:
a spring actuated inelastic band,
the inelastic band controlling the pins so that when the one pin has been pushed in by the key, the remaining pins are prevented from being pushed in.

11. The electrical connection of claim 10, further comprising:
an inelastic band controlling the pins,
ends of the band applied to a spring unit control by an electronics unit,
the band extending transverse all of the pins when the pins are in an inactivated state,
a wireless signal sent to the electronics unit releasing a hook in connection to the band and the spring, allowing a corresponding one of the pins to be pushed in by the key and, once the corresponding pin has been pushed in by the key, preventing any other pins from being pushed in.

* * * * *